United States Patent
Heinemann

(10) Patent No.: US 12,074,726 B2
(45) Date of Patent: Aug. 27, 2024

(54) METHOD FOR DATA COMMUNICATION

(71) Applicant: Siemens Aktiengesellschaft, Munich (DE)

(72) Inventor: Gerhard Heinemann, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 18/014,680

(22) PCT Filed: May 3, 2021

(86) PCT No.: PCT/EP2021/061498
§ 371 (c)(1),
(2) Date: Jan. 5, 2023

(87) PCT Pub. No.: WO2022/008115
PCT Pub. Date: Jan. 13, 2022

(65) Prior Publication Data
US 2023/0198798 A1 Jun. 22, 2023

(30) Foreign Application Priority Data
Jul. 6, 2020 (EP) .................................... 20184251

(51) Int. Cl.
*G06F 15/177* (2006.01)
*H04L 12/40* (2006.01)
(Continued)

(52) U.S. Cl.
CPC ............ *H04L 12/40* (2013.01); *H04L 43/022* (2013.01); *H04L 43/08* (2013.01)

(58) Field of Classification Search
None
See application file for complete search history.

(56) References Cited

U.S. PATENT DOCUMENTS 7,228,374 B2 *  6/2007  Hammer ............ G05B 19/4141
                                               710/305
2002/0064185 A1   5/2002  Nakai
(Continued)

FOREIGN PATENT DOCUMENTS

CN    104290096 A    1/2015
CN    105365579 A    3/2016
(Continued)

OTHER PUBLICATIONS

PCT International Search Report and Written Opinion of International Searching Authority mailed Jul. 16, 2021 corresponding to PCT International Application No. PCT/EP2021/061498 filed May 3, 2021.
(Continued)

*Primary Examiner* — Phuoc H Nguyen
(74) *Attorney, Agent, or Firm* — Henry M. Feiereisen LLC

(57) ABSTRACT

In a method for data communication between a control unit and a drive system, the control unit and the drive system are connected to one another, preferably via a bus, in such a manner that data is transmitted by a telegram. The telegram includes an instruction which can be configured for recording and includes an identifier. At least one actual value, preferably a plurality of actual values, and/or of an actual value sequence, preferably a plurality of actual value sequences, of the drive system, are recorded through the instruction for recording, and at least one defined actual value from a plurality of actual values and/or recording at least one defined actual value sequence from a plurality of actual value sequences can be recorded through the identifier.

20 Claims, 2 Drawing Sheets

(51) Int. Cl.
  *H04L 43/022* (2022.01)
  *H04L 43/08* (2022.01)

(56) References Cited

U.S. PATENT DOCUMENTS

| | | |
|---|---|---|
| 2003/0014387 A1 | 1/2003 | Kreidler et al. |
| 2007/0065151 A1 | 3/2007 | Dybsetter et al. |
| 2013/0093488 A1 | 4/2013 | Ramaswami |
| 2014/0046574 A1 | 2/2014 | Eisenbarth |
| 2015/0281355 A1 | 10/2015 | Maturana et al. |
| 2018/0152123 A1 | 5/2018 | Zhang et al. |
| 2018/0259933 A1 | 9/2018 | Künzel et al. |
| 2018/0274352 A1* | 9/2018 | Orban ............... E21B 44/04 |
| 2019/0204467 A1* | 7/2019 | Curt ................. E21B 47/13 |
| 2019/0227521 A1 | 7/2019 | Brinkhaus |
| 2020/0348662 A1* | 11/2020 | Cella ............ G05B 23/0286 |

FOREIGN PATENT DOCUMENTS

| | | |
|---|---|---|
| CN | 105490747 A | 4/2016 |
| CN | 108027600 A | 5/2018 |
| CN | 109661620 A | 4/2019 |
| CN | 111034295 A | 4/2020 |
| DE | 101 52 765 A1 | 5/2003 |
| DE | 10 2009 024 101 A1 | 10/2010 |

OTHER PUBLICATIONS

Li Zhi et al.: "Research and development of high pressure common rail diesel engine diagnostic communication system", Mar. 15, 2012;.

Chan Wei Hsu et al.:"Verification of Smart Guiding System to Search for Parking Space via DSRC Communication", 2012 12th International Conference on ITS Telecommunications, Jan. 31, 2012;.

* cited by examiner

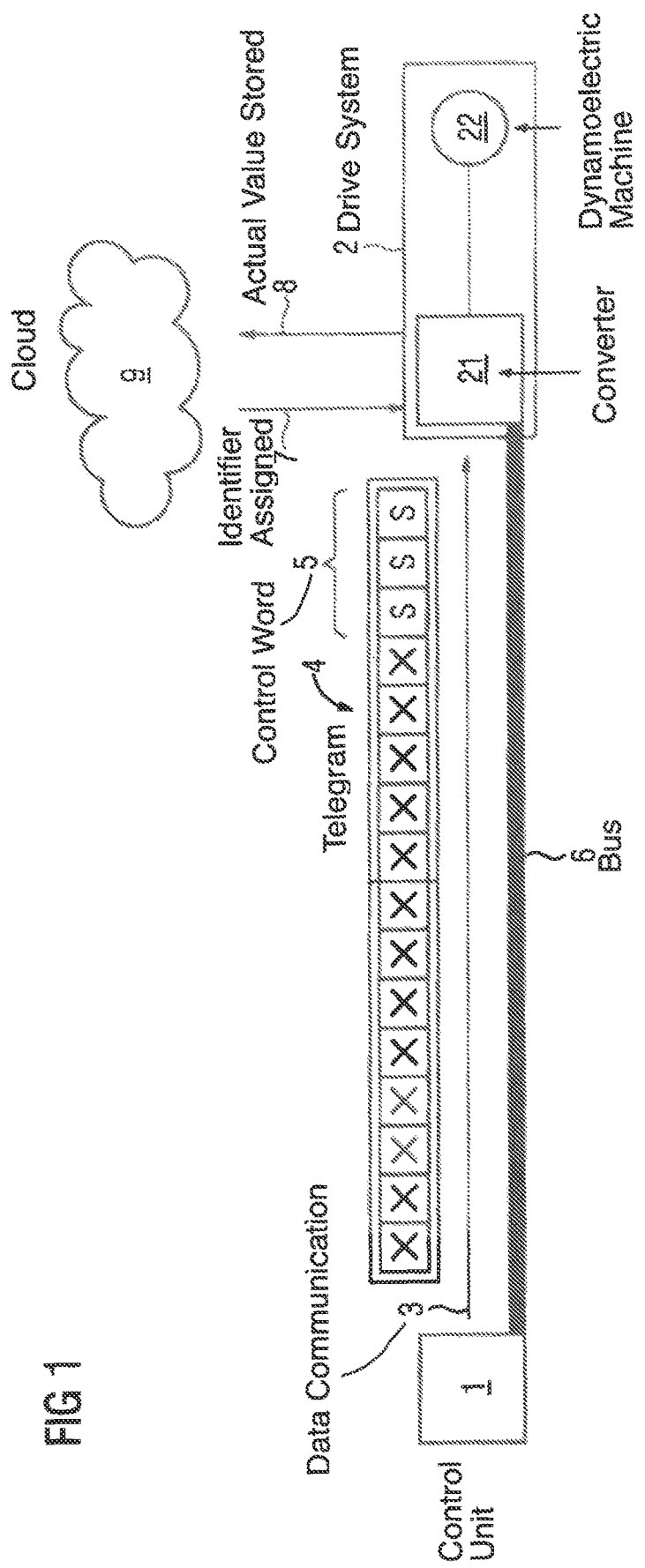

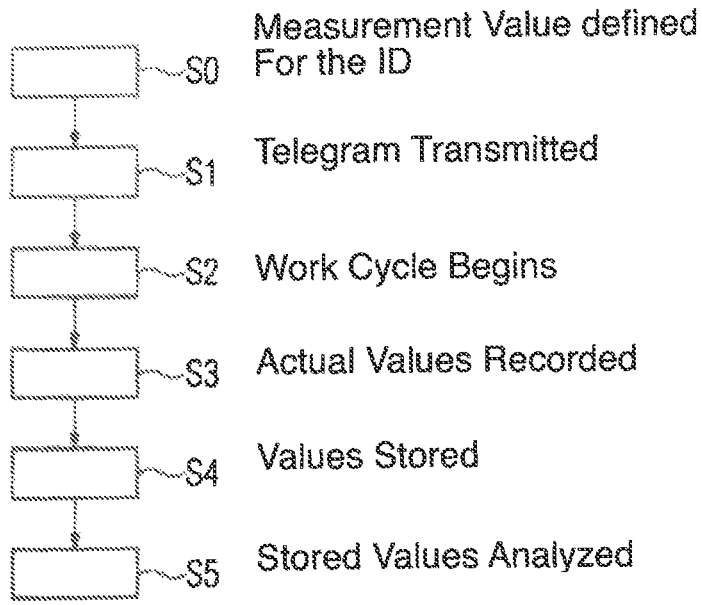
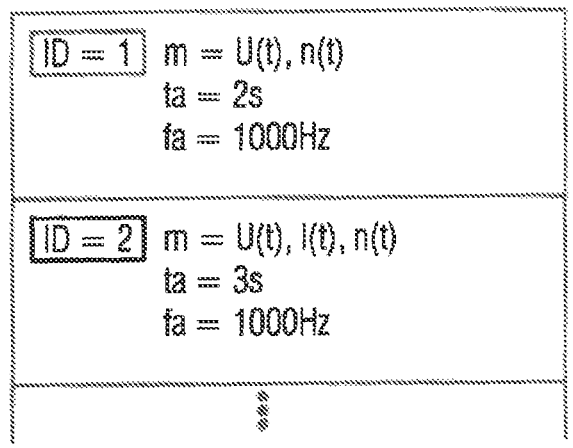
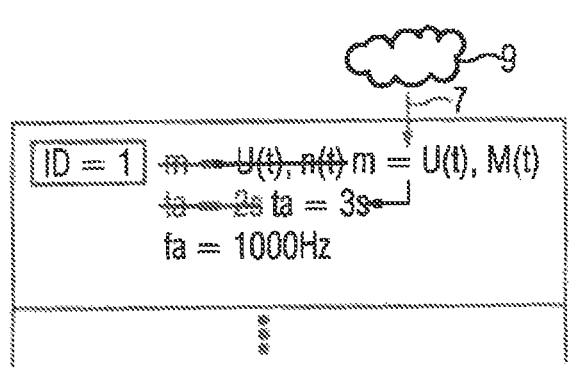

METHOD FOR DATA COMMUNICATION

CROSS-REFERENCES TO RELATED APPLICATIONS

This application is the U.S. National Stage of International Application No. PCT/EP2021/061498, filed May 3, 2021, which designated the United States and has been published as International Publication No. WO 2022/008115 A1 and which claims the priority of European Patent Application, Serial No. 20184251.5, filed Jul. 6, 2020, pursuant to 35 U.S.C. 119(a)-(d).

BACKGROUND OF THE INVENTION

The invention relates to a method for data communication between a control unit and a drive system and also to a system for carrying out the method.

In order to avoid unplanned downtimes of machines, drives and plants it is important to recognize problems at an early stage. Measurement data, such as torque, rotational speed, currents and temperatures for example, is employed for this purpose.

The measurement data is often successfully determined by a function generator. This generates a reproducible required value signal. Subsequently actual values are recorded as a reaction to the required value signal. However, this method cannot be used during ongoing operation of the plant, but exclusively in a test operating mode.

The underlying object of the invention is to obtain measurement data from the ongoing operation of the plant.

SUMMARY OF THE INVENTION

The object is successfully achieved by a method for data communication between a control unit and a drive system, wherein the control unit and the drive system are connected to one another via a bus in such a way that data is transmitted by means of a telegram, wherein the telegram comprises at least one instruction, preferably a plurality of instructions, wherein the telegram comprises at least one instruction for recording, wherein a recording of at least one actual value, preferably of a plurality of actual values, and/or an actual value sequence, preferably a plurality of actual value sequences of the drive system is caused by the instruction for recording.

The invention is particularly well suited to machine tools. Other applications are also conceivable, however.

The drive system preferably comprises a converter and a dynamoelectric machine, in particular a motor.

In an advantageous embodiment the telegram is distributed at predetermined or predeterminable points in time.

The telegram can be distributed cyclically. However other points in time are also possible.

In an advantageous form of embodiment the instruction is a control word.

The telegram advantageously has a length of two bytes. A control word occupies three bits for example. Other telegram lengths and bits occupied are conceivable, however.

In an advantageous embodiment the telegram has an instruction about the behavior of the drive system.

The instruction about the behavior of the drive system can trigger a work cycle for example. This is carried out for example by an instruction to start the drive system and/or by specifying a required rotational speed value.

A work cycle is for example a startup process of the machine or a constant speed process. The desired work cycle can be specified in a parts program for example.

Explained by way of an example this means: the control unit sends a telegram to the drive system, preferably by means of PROFidrive, wherein the telegram comprises three control words. A first control word signals to the drive system that it should start up, a second control word specifies a speed. A third control word causes the drive system to record measurement values. Actual values and also actual value sequences of current, voltage, temperature, torque, rotational speed, etc. are suitable as measurement values. Consequently this advantageously involves an instantaneously measured value of a physical variable.

It is especially advantageous for the instruction for recording and the instruction about the behavior of the drive system to be transferred in a telegram, since through this a measurement or recording of measurement values begins when the process of the drive system also begins. The instruction for recording is thus an additional control word in the telegram.

In an advantageous embodiment the instruction for recording comprises an identifier.

In an advantageous embodiment a recording of at least one defined actual value from a plurality of actual values and/or a recording of at least one defined actual value sequence from a plurality of actual value sequences is caused by the identifier.

The identifier (ID for short) is a feature linked to a measurement value or to a number of measurement values for unique identification. The identifier is preferably an identification number.

In an advantageous embodiment a defined sampling rate of the recording from a plurality of sampling rates and/or a defined recording duration from a plurality of recording durations is caused by the identifier.

Explained using the example above this means: the identifier signals specific values that are to be measured. This is advantageously stored in the drive and can also be changed. For example ID=0 means that a rotational speed and a temperature are to be measured. Moreover the identifier indicates for how long the measurement values are to be recorded and with what sampling rate. The ID preferably serves as a trigger, so that the drive starts a series of measurements. A parameterization, i.e. an assignment of values to be recorded to an ID, can be undertaken during a commissioning of the drive system for example.

In a further advantageous embodiment the defined actual value and/or the defined actual value sequence is assigned to the identifier, preferably under remote control, in particular by means of cloud computing, during ongoing operation of the drive system.

The actual value defined for the recording and/or the actual value sequence defined for the recording are involved here.

In a further advantageous embodiment the defined sampling rate and/or the defined recording duration is assigned to the identifier, preferably under remote control, in particular by means of cloud computing, during ongoing operation of the drive system.

A parameterization, i.e. an assignment of values to be recorded to an ID, can also be undertaken after commissioning. Moreover this is in particular carried out under remote control, in particular by means of cloud computing.

This is helpful when measurement values of interest are not yet known during commissioning and only emerge from empirical values during the operation of the plant.

Moreover the sampling rate and/or the recording duration can also be changed in this way.

This has the advantage that a measurement can be undertaken while the plant is in operation. It is not necessary to stop the plant and take the measurement in a test operating mode.

In an advantageous embodiment, after recording of the actual value, a recorded actual value and/or after recording of the actual value sequence a recorded value sequence is stored, in particular by means of cloud computing.

In an advantageous embodiment the identifier is stored, especially by means of cloud computing.

The recorded values are thus uniquely assigned to the identifier in a memory unit. The memory unit is preferably a cloud memory unit.

In a further advantageous embodiment the recorded actual value and/or the recorded actual value sequence is compared with a further recorded actual value of a further recording and/or a further recorded actual value sequence of the further recording.

This offers the advantage that values from a real operation of the plant can be recorded. The storage of the associated identifier enables processes, in particular recurring processes, to be compared. For example values that have been acquired immediately after comprehensive maintenance can be compared with values that were acquired after predetermined operating hours intervals, for example 1000 operating hours. This enables conclusions to be drawn about whether maintenance work is necessary.

Moreover an accuracy of a driven machine tool can be detected and assessed in this way.

The above object is also achieved by claim 13, i.e. a system for carrying out such a method, having:
- a control unit and
- a drive system, wherein the control unit and the drive system are connected to one another via a system for data transmission, preferably via a bus.

The system is explained in the description of the figures.

BRIEF DESCRIPTION OF THE DRAWING

The invention will be explained and described in greater detail below with the aid of the exemplary embodiments shown in the figures. In the figures:

FIG. 1 shows a system having a control unit and a drive system,

FIG. 2 shows an example of a method sequence,

FIG. 3 shows examples of parameters for the identifier,

FIG. 4 shows a change of an ID assignment.

DETAILED DESCRIPTION OF PREFERRED EMBODIMENTS

FIG. 1 shows a system, having a control unit 1 and a drive system 2. The control unit 1 and the drive system 2 are connected to one another via a system for data transmission, preferably via a bus 6.

The drive system 2 comprises a converter 21 and also a dynamoelectric machine 22. The dynamoelectric machine 22 is preferably a dynamoelectric rotating machine, in particular a motor. However a linear motor is also possible in the arrangement shown.

The system makes it possible to carry out a method shown in FIG. 2.

The control unit 1 is preferably a Programmable Logic Controller (PLC for short) or another unit for control of movements. The control unit 1 generates required rotational speed and/or position values and/or inserts situation-related identifiers (also: situation identifiers).

The situation identifier is advantageously inserted into a telegram 4 to the drive system 2 at a point in time at which a process begins that appears to be of interest for a later measurement evaluation. Since a number of different processes can be of interest, the identifier preferably contains a number by which the different processes are able to be distinguished.

The points in the execution sequence of a process at which a specific identifier is inserted are decided for example by a programmer of the PLC or by a creator of the parts program of a machine tool.

What happens in the drive when a specific identifier occurs is defined for example during the commissioning of the drive system 2 or after commissioning from a cloud 9.

The converter 21 advantageously comprises a closed-loop drive control and also an open-loop control of a situation-related measurement data recording.

Data communication 3 between the control unit 1 and the drive system 2 is preferably undertaken by the bus 6. Data is transmitted by means of a telegram 4.

In the figure the telegram 4 comprises two bytes. Other telegram lengths are also conceivable. The telegram 4 comprises at least one instruction, preferably a plurality of instructions, wherein the telegram comprises at least one instruction for recording, wherein a recording of at least one actual value, preferably of a plurality of actual values, and/or of an actual value sequence, preferably of a plurality of actual value sequences, of the drive system is caused by the instruction for recording.

An actual value is a value at one point in time for example. An actual value can for example also be an averaged value over a short period of time.

An actual value sequence is advantageously a plurality of values, in particular different values, during a recording duration.

The instruction for recording is advantageously a control word 5.

Moreover the telegram 4 advantageously contains an instruction about the behavior of the drive system, for example about the beginning of a defined work cycle.

The Instruction for recording preferably comprises an identifier (ID).

On occurrence of a specific ID a measurement function belonging to the ID is carried out. The ID determines which actual value (for example current, rotational speed, temperature) will be recorded and also the recording duration and the sampling rate of the recording. For example a selection is made from a list of those actual values to be recorded that are linked to the ID. Recording duration and sampling rate are selected in a similar way.

The cloud 9 advantageously provides a function for project planning of the situation-related measurement data recording. The cloud 9 further advantageously provides a data memory for storage of the recorded measurement data. Above and beyond this the cloud 9 advantageously provides a function for measurement data evaluation for predictive maintenance.

The Identifier is advantageously assigned the defined sampling rate and/or the defined recording duration, preferably under remote control, in particular by means of cloud computing, during ongoing operation of the drive system. This is indicated by an arrow 7 that points from the cloud 9 to the drive system 2.

After recording of the actual value a recorded actual value and/or after recording of the actual value sequence a recorded actual value sequence is advantageously stored, in particular by means of cloud computing. This is indicated by an arrow 8 that points from the drive system 2 in the direction of the cloud 9.

FIG. 2 shows an example of a method sequence.

In an optional method step S0 a measurement value is defined for the ID. This is advantageously carried out under remote control, in particular by means of cloud computing. Another, for example local, parameterization is also possible, however.

The measurement value definition is advantageously defined before the telegram is distributed.

In a method step S1 the telegram is transmitted. The telegram preferably contains a number of instructions. Through the telegram it is advantageously signaled to the drive system that a specific work cycle is to be started and also that specific measurement values are to be determined.

In a method step S2 the work cycle begins.

At the same time or offset in time to S2, in a method step S3 there is the recording of the actual value or of the actual values and/or of the actual value sequence or of the actual value sequences.

In a method step S4 the values are stored, in particular by means of cloud computing.

In a method step S5 there is an analysis of the stored values. For example values from different series of measurements are compared, preferably by means of cloud computing, in order to draw conclusions about wear or damage and be able to plan maintenance work.

Unplanned downtimes of machines, drives and plants can thus be avoided since problems are recognized at an early stage.

FIG. 3 shows examples of parameters for the identifier ID. Values m to be recorded can be: voltage U (depending on a time t), rotational speed n, current I and torque M. Further values to be recorded can be: position, rotational speed deviation, position deviation, error messages, load, main voltage, DC link circuit voltage, digital inputs, temperatures, for example motor temperature and/or transistor temperature and/or ambient temperature etc.

The Identifier ID advantageously only represents a trigger signal with a code. The measurement signals are assigned in the drive system 2 or from the cloud 9.

Moreover a recording duration ta and also a sampling rate fa are indicated.

FIG. 4 shows a change of an ID assignment.

The defined actual value and/or the defined actual value sequence are advantageously assigned to the identifier ID, preferably under remote control, in particular by means of cloud computing, during ongoing operation of the drive system.

The defined sampling rate and/or the defined recording duration are advantageously assigned to the identifier ID, preferably under remote control, in particular by means of cloud computing, during ongoing operation of the drive system.

The figure shows that the values m to be recorded and also the recording duration ta are changed by means of the cloud 9.

The change can be made by the cloud 9 during ongoing operation.

The invention is suitable for example for detecting an accuracy of machine tools or a change to the latter.

The invention claimed is:

1. A method for data communication between a control unit and a drive system, the method comprising:

connecting the control unit and the drive system to one another;

transmitting data between the control unit and the drive system by a telegram, wherein the telegram comprises an instruction configurable for recording and comprising an identifier;

recording at least one actual value and/or an actual value sequence of the drive system, through the instruction for recording; and recording at least one defined actual value from a plurality of actual values and/or recording at least one defined actual value sequence from a plurality of actual value sequences through the identifier, wherein through the identifier, a defined sampling rate of a recording from a plurality of sampling rates and a defined recording duration from a plurality of recording durations is caused.

2. The method of claim 1, further comprising distributing the telegram at predetermined or predeterminable points in time.

3. The method of claim 1, wherein the telegram includes a plurality of instructions, with at least one instruction being a control word.

4. The method of claim 1, wherein the telegram includes a plurality of instructions, with at least one instruction being an instruction about a behavior of the drive system.

5. The method of claim 1, wherein the defined actual value and/or the defined actual value sequence are assigned to the identifier, preferably under remote control, in particular by means of cloud computing, during ongoing operation of the drive system.

6. The method of claim 1, wherein the defined sampling rate and/or the defined recording duration are assigned to the identifier, preferably under remote control, in particular by means of cloud computing, during ongoing operation of the drive system.

7. The method of claim 1, wherein after recording of the actual value, a recorded actual value, and/or after recording of the actual value sequence, a recorded actual value sequence, is stored, in particular by means of cloud computing.

8. The method of claimed 7, further comprising comparing the recorded actual value and/or the recorded actual value sequence with a further actual value of a further recording and/or of a further recorded actual value sequence of the further recording.

9. The method of claim 1, further comprising storing the identifier, in particular by means of cloud computing.

10. The method of claim 1, wherein the connecting comprises connecting the control unit and the drive system to one another via a bus, and the recording further comprises recording a plurality of actual values, and/or a plurality of actual value sequences.

11. A system, comprising:
a control unit;
a drive system; and
a system for data transmission connecting the control unit and the drive system to one another;
wherein the system is configured
  to transmit data between the control unit and the drive system by a telegram, wherein the telegram comprises an instruction configurable for recording and comprising an identifier;
  to record at least one actual value and/or an actual value sequence of the drive system, through the instruction for recording; and to record at least one defined actual value from a plurality of actual values and/or recording at least one defined actual value sequence from a plurality of actual value sequences through the identifier, wherein through the identifier, a defined sampling rate of a recording from a plurality of sampling rates and a defined recording duration from a plurality of recording durations is caused.

12. The system of claim 11, wherein the system is configured to distribute the telegram at predetermined or predeterminable points in time.

13. The system of claim 11, wherein the instruction is a control word.

14. The system of claim 11, wherein the telegram includes a plurality of instructions, with at least one instruction being an instruction about a behavior of the drive system.

15. The system of claim 11, wherein the defined actual value and/or the defined actual value sequence are assigned to the identifier, preferably under remote control, in particular by means of cloud computing, during ongoing operation of the drive system.

16. The system of claim 11, wherein the defined sampling rate and/or the defined recording duration are assigned to the identifier, preferably under remote control, in particular by means of cloud computing, during ongoing operation of the drive system.

17. The system of claim 11, wherein after recording of the actual value, a recorded actual value, and/or after recording of the actual value sequence, a recorded actual value sequence, is stored, in particular by means of cloud computing.

18. The system of claimed 17, wherein the system is configured to compare the recorded actual value and/or the recorded actual value sequence with a further actual value of a further recording and/or of a further recorded actual value sequence of the further recording.

19. The system of claim 11, wherein the system is configured to store the identifier, in particular by means of cloud computing.

20. The system of claim 11, wherein the system for data transmission comprises a bus, and the system is configured to record a plurality of actual values, and/or a plurality of actual value sequences.

* * * * *